(12) United States Patent
Granzer

(10) Patent No.: US 7,958,747 B2
(45) Date of Patent: Jun. 14, 2011

(54) METHOD OF MANUFACTURE OF GLASS FLASKS WITH STEM AND APPARATUS FOR PERFORMING OF THIS METHOD

(75) Inventor: Ján Granzer, Strezenice (SK)

(73) Assignee: Olivotto Glass Technologies S.p.A., Avigliana (TO) (IT)

( * ) Notice: Subject to any disclaimer, the term of this patent is extended or adjusted under 35 U.S.C. 154(b) by 848 days.

(21) Appl. No.: 11/663,226

(22) PCT Filed: Sep. 12, 2005

(86) PCT No.: PCT/SK2005/000018
§ 371 (c)(1), (2), (4) Date: Oct. 15, 2007

(87) PCT Pub. No.: WO2006/033646
PCT Pub. Date: Mar. 30, 2006

(65) Prior Publication Data
US 2008/0256982 A1    Oct. 23, 2008

(30) Foreign Application Priority Data
Sep. 21, 2004   (SK) .................................. 0361-2004

(51) Int. Cl.
    *C03B 9/04*    (2006.01)
(52) U.S. Cl. ........................ 65/75; 65/71; 65/266; 65/82
(58) Field of Classification Search ................ 65/77, 78, 65/79, 80, 229, 230, 242, 226, 240, 241, 65/227, 158, 174, 29.14, 29.12, 66, 67, 68, 65/71, 75, 82, 266
See application file for complete search history.

(56) References Cited

U.S. PATENT DOCUMENTS
6,497,119 B1   12/2002   Hartel et al.

FOREIGN PATENT DOCUMENTS
DE   23 51 808 A1    5/1975
DE   2351808   *    5/1975
(Continued)

OTHER PUBLICATIONS

DE 2351808 (Machine Translation) [online], [retrieved on Jun. 10, 2010], retrieved from EPO Database (http://ep.espacenet.com/advancedSearch?locale=en_EP).*

(Continued)

*Primary Examiner* — Matthew J Daniels
*Assistant Examiner* — Yana Belyaev
(74) *Attorney, Agent, or Firm* — Browdy and Neimark, PLLC

(57) ABSTRACT

The cake (7), fitted with the rough pressing (71) of the stem parison (61) is situated on the ring (8) where by the action of its own gravity, it streams off till the rough pressing (71) fits into the cavity (41) of the bottom mould (4). There the rough pressing (71) is fastened by the underpressure and the air is blasted into the flask (6) and, in the same time, the bottom mould (4) is forced downwards. When the orifice (42) of the cavity (41) comes on the level of the surface (51) of the bottom opening of the glass-blowing mould (5), the glass-blowing mould (5) is closed and the air is blasted into the flask (6) until it obtains the shape of the inner wall (52) of the glass-blowing mould (5).

6 Claims, 2 Drawing Sheets

FOREIGN PATENT DOCUMENTS

| | | |
|---|---|---|
| DE | 103 48 241 A1 | 5/2004 |
| FR | 2 049 329 A | 3/1971 |
| FR | 2 450 786 A1 | 10/1980 |
| FR | 2450786 * | 11/1980 |
| GB | 1 528 849 A | 10/1978 |
| JP | 55-121918 A | 9/1980 |

OTHER PUBLICATIONS

FR 2450786 (Machine Translation) [online], [retrieved on Jun. 10, 2010], retrieved from EPO Database (http://ep.espacenet.com/advancedSearch?locale=en_EP).*

PCT International Search Report and Written Opinion mailed Nov. 10, 2005.

* cited by examiner

METHOD OF MANUFACTURE OF GLASS FLASKS WITH STEM AND APPARATUS FOR PERFORMING OF THIS METHOD

TECHNICAL FIELD

The invention is concerned in the manufacturing method of stems of glass flasks and in the apparatus for performing of this method suitable mainly for the production of glass flasks with the integrated stem parison on automatic glass-blowing machines.

BACKGROUND ART

In order to be successful on the market, the products of household glass category, as e.g. beverages glasses, candlesticks and vases made of crystal glass must satisfy the claims of the widest consumer area from the point of view of the acceptable price, of aesthetic and utility properties. The costs of the used material, the actual cost of necessary manufacturing apparatus and of the necessary moulds have the decisive influence on the price of such product. From the point of view of price, it is useful to use the barium crystal glass which price is multiple lower than the price of the lead crystal glass. As far as the beverage glass is concerned, also the conviction of some consumers (though ungrounded) of the health harmfulness of the lead crystal glass due to the possible getting lose of lead from the flask into the beverage speaks for the benefit of barium crystal glass. From the aesthetic point of view, the customers prefer the household glass, the stem of which makes with the flask a compact whole because it evokes the impression that the product was made by the traditional handmade blowing mode. On the contrary, the household glass, the stem of which does not make a compact whole with the flask, customers identify as the mass production on machines that is inevitable to meet market needs on quantity and price of the household glass. Also from the point of view of practical properties of use, representing above all the simple keeping clear and the long service life of the beverage glass, customers prefer glasses, the stem of which makes with the flask a compact whole.

The household glass with a stem is being manufactured with a pressed stem or with a drawn one. The drawn stem is being manufactured as a separate part. The stem will be then welded to the cup that was manufactured on the blowing apparatus in the glass-blowing mould. From the point of view of price, it is advantageous that the cup is manufactured on the relatively simple automatic blowing apparatus, i.e. the actual cost for the manufacturing apparatus and moulds, the operation and maintenance costs of such machine are relatively low. With regard to the fact that the cup making is carried only in the glass-blowing mould, the quality of its outer surface is very high. But the disadvantage of the barium crystal glass consists in the fact, that high internal stresses occur in the products made of it during the cooling down, the elimination of which needs the use of further technological operations. This disadvantageous property of the barium crystal glass is growing in welding the flask to the pressed stem that are heated-up to the unequal temperature, in consequence of that extraordinary high internal stresses occur on the welding spot. These facts cause problems with the cracking of glass products during the manufacturing, and in consequence of residual internal stress, these problems occur also at customers. Besides the fact that it can come to spontaneous rupture of the glass product, mainly the cleaning of the beverage glass in automatic dish-washing machines is dangerous. From the point of view of cleanness maintaining mainly of the beverage glass, it is disadvantageous, that a recess in the joining spot of the flask with the stem is formed, the cleanness of which it is difficult to maintain.

The drawn stem is manufactured by drawing of the stem parison that forms with the flask a compact whole, because it is manufactured together with the flask from the only part of material. The flask is made in such a way that the approximate shape of the flask is manufactured by pressing from the dose of molten glass together with the final shape of the stem parison. Then the flask will be formed-up by blowing to the final required shape. The disadvantage of it is the fact, that for making the flask with the stem parison, sizable automatic pressing and blowing machines are necessary and their price is substantially higher then the price of blowing machines and their operation and maintenance are also more expensive. Also the costs for the manufacturing of glass-blowing moulds needed for the flask rough pressing are very high. In spite of the fact that the final flask shape is being produced in the glass-blowing mould, the surface quality of the flask can be lowered as a result of tool marks during the pressing.

From the commercial point of view, it seems to be perfect to produce flasks of crystal household glass of barium crystal glass with the stem parison on inexpensive automatic glass-blowing machines. But the attempts to produce flasks with the stem parison on usual automatic blowing machine were unsuccessful. As the glass-blowing mould has an aperture on its bottom part, into that the stem parison being in that time in the plastic state, was introduced by the action of its gravity after the filling of the glass-blowing mould cavity with the flask, occurred a sticking of the stem parison and of the outer wall of the flask bottom to the glass-blowing mould. As the blown flask rotates in the glass-blowing mould and the glass-blowing mould is stationary, then a deformation both of the stem parison and the flask bottom occur.

DISCLOSURE OF INVENTION

The above mentioned imperfections will be removed in the considerable extend by the method of manufacture of the flask of the glass vessels with a stem according to the invention, the nature of which consists in the fact that the dose of the molten glass will be introduced into the parison mould, where a cake, having on its bottom part a rough pressing of the stem parison will be pressed. Then the cake will be positioned on the rotating ring arranged above the glass-blowing mould, the axis of rotation of which is in the straight line with the longitudinal axis of the glass-blowing mould. Subsequently, the cake will be pushed against the rotating ring by the holder of the blowing apparatus and by the action of its own gravity it streams off spontaneously through the ring aperture and changes its shape into the shape of the flask. The rough pressing of the stem parison fits into the cavity of the bottom mould rotating in the same direction as the ring, this mould being shifted out into the area of the opened glass-blowing mould close under the rotating ring. In the cavity of the bottom glass-blowing mould, the rough pressing of the stem parison will be fastened by the underpressure. By the blowing apparatus, the air is blasted-in into the flask and, in the same time, the bottom glass-blowing mould is being forced downwards, till the cavity orifice of the bottom glass-blowing mould comes in the level of the inner rotary surface of the bottom orifice of the glass-blowing mould. Then the glass-blowing mould will be closed and by the blowing apparatus, the air is blasted into the flask, until the flask obtains the shape of the inner wall of the glass-blowing mould, where it will be subsequently cooled down into the solid state. In the same time, the final shape of the stem parison will be finished in the cavity of the bottom glass-blowing mould by the action of both gravity and underpressure, the stem parison will be subsequently cooled down into the solid state. Then the underpressure will be released in the cavity of the bottom glass-blowing mould and the bottom glass-blowing mould will be shifted downwards. The glass-blowing mould will be then opened and therefore the finished flask with the integrated stem parison will be released. This way makes possible to manufacture flasks of glass vessels with the stem parison of the barium crystal glass.

The execution of the method is possible by using the apparatus made by the automatic glass-blowing machine according to the Invention, the nature of which consisting in the die of the parison mould of the automatic glass-blowing machine being fitted with a recess, the volume of which is the same as the volume of the stem of the particularly manufactured glass flask and each blowing station of the automatic glass-blowing machine being fitted with a bottom glass-blowing mould, arranged in the rotary and moving way in the vertical direction, which cavity has the both shape and volume the same as the both shape and volume of the recess of the parison mould die. Such arrangement makes possible to manufacture flasks with the integrated stem parison on an usual automatic glass-blowing machine. In order to make possible the introducing of the bottom glass-blowing mould into the bottom orifice of the glass-blowing mould an to obtain the smooth connection of the stem parison to the flask, the cavity of the bottom glass-blowing mould is fitted with an orifice, the outer rotary surface of which has a smaller diameter than the diameter of the inner rotary surface of the bottom orifice of the bottom glass-blowing mould and is parallel with the inner rotary surface of the bottom orifice of the bottom glass-blowing mould.

The nature of the invention consists further in the outer rotary surface of the orifice of the bottom glass-blowing mould being made advantageously by a rotary cylindrical surface.

In order to the design of the orifice be as massive as possible and therefore to obtain its increased service life in the case of manufacturing of slender flasks, when in the case of cylindrical outer rotary orifice surface, the orifice vertex angle would be very acute, the nature of the Invention consists further in the outer rotary orifice surface of the bottom surface being alternatively designed as a conical one.

In order to make possible to adjust the vertical position of the bottom glass-blowing mould according to the wear of the lining of the glass-blowing mould and in such way to make possible to secure constantly the manufacture of flasks with the continuous connection of the stem parison, the nature of the invention consists further in the bottom glass-blowing mould being arranged adjustable in the vertical direction.

Finally, the nature of the invention consists in openings made in the bottom glass-blowing mould for generating an air underpressure leading into the cavity of the bottom glass-blowing mould, whereby the rigid clamping of the stem parison in the cavity of the bottom glass-blowing mould and therefore the reliable achieving of the desired both shape and size of the stem parison is secured.

The advantage of the manufacture of flasks of glass vessels according to the method and on the apparatus according to the Invention consist in making favourable conditions for the manufacturing of household glass products with a stem above all from the point of view of acceptable price because it makes possible to produce these products of the cheaper barium crystal glass on the inexpensive automatic glass-blowing machines, the maintenance of which is less expensive than the maintenance of robust and from the point of view of design more complicated automatic glass-blowing and glass-pressing machines. At the same time, also their operation is less expensive, because the manufacture does not require the use of expensive pressmoulds necessary for each type of the manufactured glass vessels, but only the use of relatively cheap glass-blowing moulds. Also from the point of view of aesthetic and utility properties of glass products with stem, the manufacturing method is a contribution, because it makes possible to produce glass products with drawn stems required by the customers. Altogether, the manufacturing method according to the Invention contributes to the increasing of the competitive strength of the glass household products made according to this method.

BRIEF DESCRIPTION OF DRAWINGS

The invention will be close explained by means of drawings, from which

MODE FOR CARRYING OUT THE INVENTION

Figure 1:
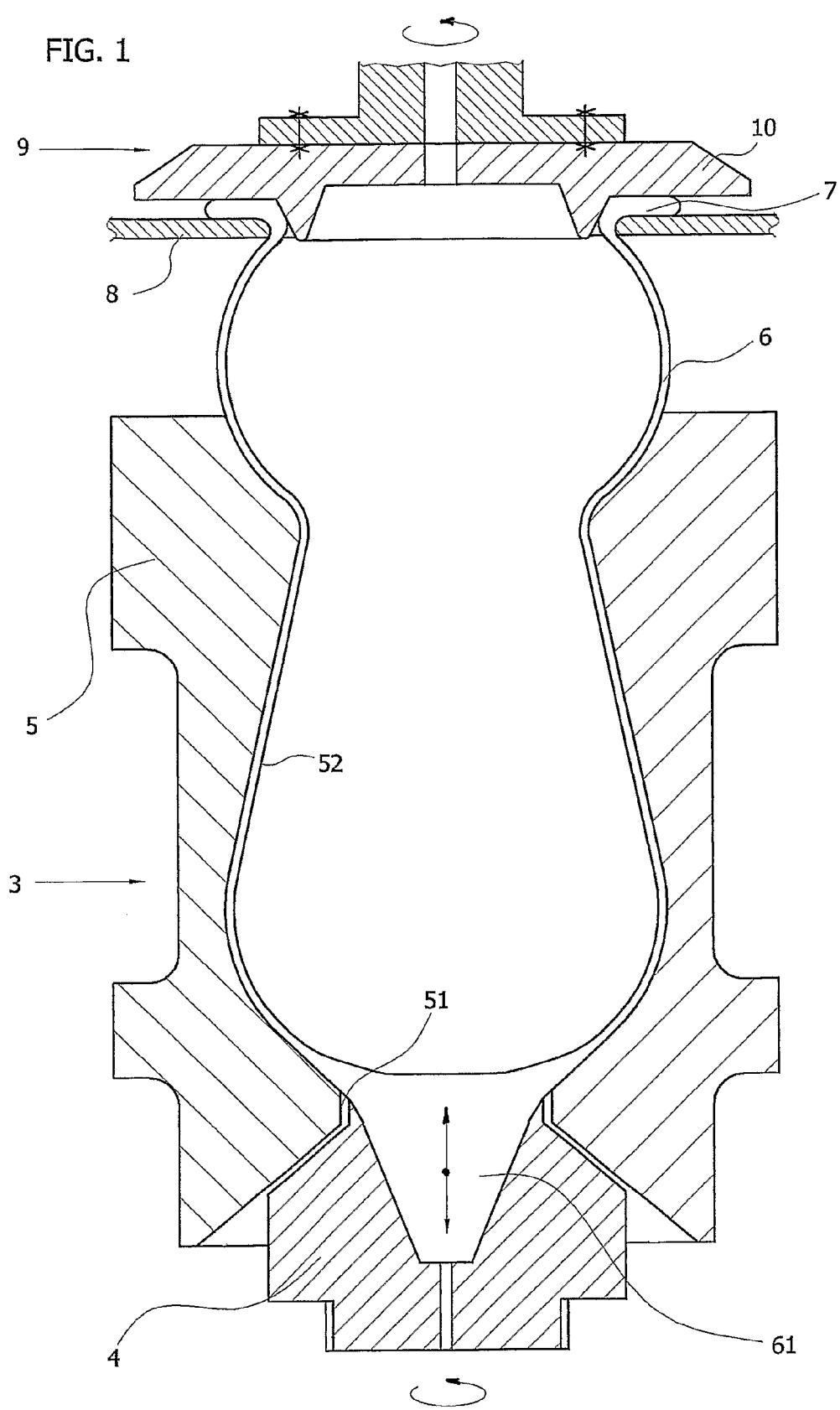
FIG. 1 schematically demonstrates the longitudinal section of the station of the glass-blowing machine with the flask blown-out into the final shape, FIG. 2 demonstrates the longitudinal section of the parison mould with pressed cake, FIG. 3 demonstrates the longitudinal section of the bottom glass-blowing mould with cylindrical outer orifice surface and FIG. 4 demonstrates the longitudinal section of the bottom glass-blowing mould with conical outer orifice surface.
Figure 2:
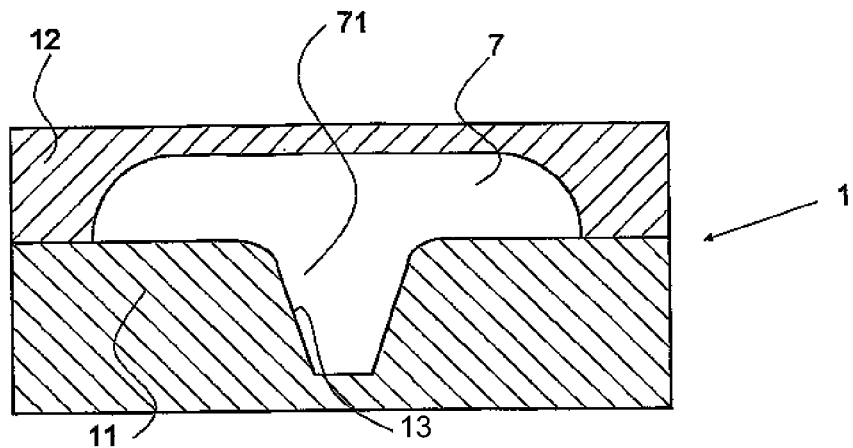
Figure 3:
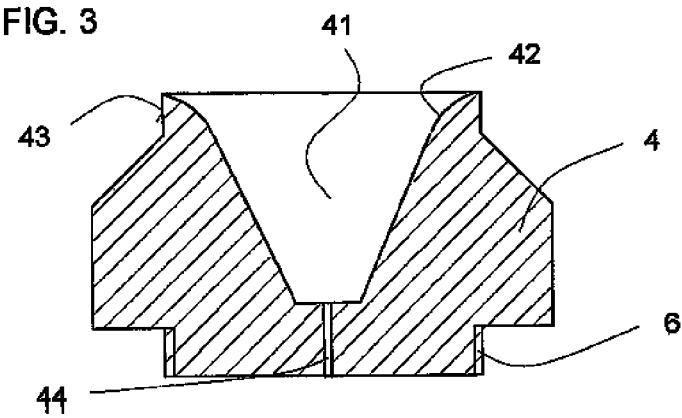
Figure 4:
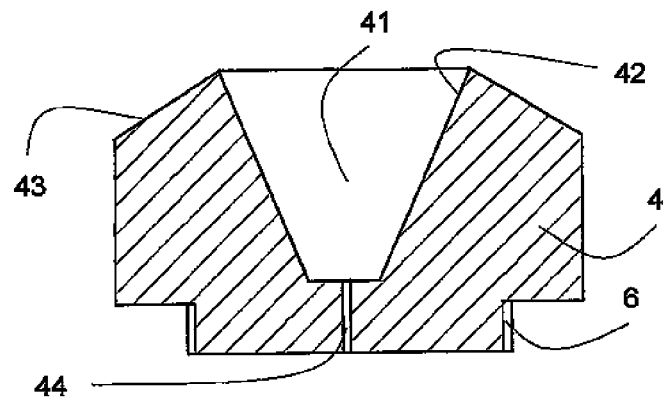

On the (non-demonstrated) body of the rotary glass-blowing machine, the parison mould 1, made by the fixed bottom die 11 and the movable punch 12, out of the motion path of blowing stations 3 is arranged. The die 11 of the parison mould 1 of the automatic glass-blowing machine is fitted with the recess 13, the volume of which is the same as the stem volume of the particularly manufactured glass flask and each blowing station 3 of the automatic glass-blowing machine is fitted with the bottom mould 4 arranged rotary and movable in the vertical direction, its cavity 41 having both shape and volume the same as both the shape and volume of the recess 13 of the bottom die 11, the cavity 41 of the bottom mould 4 being fitted with the orifice 42, the outer rotary surface 43 of which having the diameter smaller than the diameter of the inner rotary surface 51 of the bottom orifice 51 of the glass-blowing mould 5 and being parallel with the inner rotary surface 51 of the bottom opening of the glass-blowing mould 5. The outer rotary surface 43 of the orifice 42 is advantageously formed as a cylindrical one, because the bottom mould 4 rotates and the blowing mould 5 does not move and during the finishing of the shape of the flask 6, the outer rotary surface 43 of the orifice 42 of the bottom mould 4 is situated against the inner rotary surface 51 of the bottom opening of the glass-blowing mould 5.

In order to the design of the orifice 42 be as massive as possible and in this way to obtain its increased service life in the case of manufacturing of slender flasks 6, when in the case of cylindrical outer rotary orifice surface 43 of the orifice 42 the vertex angle of the orifice 42 would be very acute, is the outer rotary surface 43 of the orifice 42 of the bottom glass-blowing mould 4 advantageously alternatively made as a conical one. In order to make possible to adjust the vertical position of the bottom glass-blowing mould 4 according to the wear of the lining of the glass-blowing mould 5 and in such way to make possible to secure constantly the manufacture of flasks 6 with the continuous connection of the stem parison 61, is the bottom glass-blowing mould 4 arranged adjustable in the vertical direction. In the bottom glass-blowing mould 4, openings 44 are made for generating an air underpressure, leading into the cavity 41 of the bottom glass-blowing mould 4, whereby the reliable clamping of the stem parison 61 in the cavity 41 of the bottom glass-blowing mould 4 and therefore the reliable achieving of the desired both shape and size of the stem parison 61 is secured.

The mentioned apparatus functions in the way that the dose of the molten glass is introduced into the parison mould 1, where a cake 7, hawing on its bottom part a rough pressing 71 of the stem parison 61 will be pressed. Then the cake 7 is positioned on the rotating ring 8 arranged above the glass-blowing mould 5, the axis of rotation of which is in the straight line with the longitudinal axis of the glass-blowing mould 5. Subsequently, the cake 7 is pushed against the rotating ring 8 by the holder 10 of the blowing apparatus 9 and by the action of its gravity the cake 7 streams off spontaneously through the aperture of the ring 8 and changes its shape into the shape of the flask 6. The rough pressing 71 of the stem parison 61 fits into the cavity 41 of the bottom mould 4 rotating in the same direction as the ring 8, this mould being shifted out into the area of the opened glass-blowing mould 5 close under the rotating ring 8. In the cavity 41 of the bottom glass-blowing mould 4 the rough pressing 71 of the stem parison 61 will be fastened by the underpressure made through the openings 44. By the blowing apparatus 9, the air is blasted into the flask 6 and, in the same time, the bottom glass-blowing mould 4 is forced downwards, till the orifice 42 of the cavity 41 of the bottom glass-blowing mould 4 comes in the level of the inner rotary surface 51 of the bottom opening of the glass-blowing mould 5. Then the glass-blowing mould 5 will be closed and by the blowing apparatus 9, the air is blasted into the flask 6, until the flask 6 obtains the shape of the inner wall 52 of the glass-blowing mould 5 where it will be subsequently cooled down into the solid state. In the same time, the final shape of the rough pressing of the stem parison 61 will be finished in the cavity 41 of the bottom glass-blowing mould 4 by the action of both gravity and underpressure the stem parison 61 is subsequently cooled down into the solid state. The underpressure will be released in the cavity 41 of the bottom glass-blowing mould 4 and then the bottom glass-blowing mould 4 is shifted downwards and the glass-blowing mould 5 is opened, and therefore the finished flask 6 with the integrated stem parison 61 is released.

INDUSTRIAL APPLICABILITY

Besides of newly manufactured automatic glass-blowing machines, this invention can by utilized also on existing automatic glass-blowing machines through their reconstruction in that way, that they enclose the apparatus according to this invention.

The invention claim is:

1. A method of manufacture of a glass vessel, the glass vessel comprising a flask (6) and an integrated stem, comprising the steps of:
    introducing a dose of molten glass into a parison mould (1), in which a cake (7) is formed having a rough pressing (71) of a stem parison (61) projecting from its bottom,
    placing the cake (7) on a rotating ring (8) arranged above a glass-blowing mould (5) having a vertically movable bottom mould (4), the rotating ring (8) arranged to rotate in a given direction around an axis of rotation, the movable bottom mould having a cavity (41) and arranged to rotate in the same direction as the rotating ring (8), the axis of rotation of the rotating ring (8) laying in straight line with a longitudinal axis of the glass-blowing mould (5),
    clamping a periphery of the cake (7) against the rotating ring (8) by a holder (10) of a blowing apparatus (9), wherein the cake (7) streams off spontaneously by gravity through the rotating ring (8) and changes shape into a shape of the flask (6),
    shifting out the bottom mould (4) into an area of the glass-blowing mould (5), in an open configuration, close under the rotating ring (8), the rough pressing (71) fitting into the cavity (41) of the bottom mould (4),
    fastening the rough pressing (71) in the cavity (41) of the bottom mould (4) by underpressure,
    blasting air into the flask (6) by said blowing apparatus (9) and, at the same time, forcing the bottom mould (4) downwards until an orifice (42) of the cavity (41) of the bottom mould (4) reaches a level of an inner rotary surface (51) of a bottom opening of the glass-blowing mould (5),
    closing the glass-blowing mould (5) and blasting air into the flask (6) until the flask (6) takes the form of an inner wall (52) of the glass-blowing mould (5),
    cooling down the flask in the glass-blowing mould (5) into a solid state and, simultaneously, by action of both gravity and underpressure, finishing a final shape of the stem parison (61) to form the integrated stem in the cavity (41) of the bottom mould (4) integrated with the flask (6), which stem is subsequently cooled down into a solid state,
    releasing the underpressure in the cavity (41) of the bottom mould (4) and shifting the bottom mould (4) downwards, and
    opening the glass-blowing mould (5) and therefore releasing the flask (6) with the integrated stem.

2. An automatic glass-blowing apparatus for performing the method of claim 1, comprising:
    a parison mould (1) having a bottom die (11), and
    a blowing station (3) provided with the vertically movable bottom mould (4), wherein said bottom die (11) is provided with a recess (13) whose volume is the same as a volume of the integrated stem of the glass vessel, and said bottom mould is rotary and comprises a cavity (41) which has a shape and volume equal to a shape and volume of the recess (13) of the bottom die (11), said cavity (41) of the bottom mould (4) comprising an orifice (42), the orifice (42) comprising an outer rotary surface (43) having a diameter smaller than a diameter of an inner rotary surface (51) of a bottom opening of the glass-blowing mould (5) and is parallel with said inner rotary surface (51) of the bottom opening of the glass-blowing mould (5).

3. The apparatus according to claim 2, wherein the outer rotary surface (43) of the orifice (42) of the bottom mould (4) is cylindrical.

4. The apparatus according to claim 2, wherein the outer rotary surface (43) of the orifice (42) of the bottom mould (4) is conical.

5. The apparatus according to claim 2, wherein the bottom mould (4) is arranged moveably in the vertical direction.

6. The apparatus of claim 5, wherein openings (44) are formed in the bottom mould (4) for generating the air underpressure into the cavity (41) of the bottom mould (4).

* * * * *